United States Patent [19]

Wolf

[11] 4,238,964
[45] Dec. 16, 1980

[54] VACUUM GAUGE

[75] Inventor: Raymond A. Wolf, Albany, Oreg.

[73] Assignee: Teledyne Industries, Inc., Los Angeles, Calif.

[21] Appl. No.: 77,321

[22] Filed: Sep. 20, 1979

[51] Int. Cl.³ .............................................. G01L 9/12
[52] U.S. Cl. ...................................... 73/714; 73/708; 73/724; 73/756
[58] Field of Search .................. 73/708, 710, 718, 724, 73/755, 756, 714

[56] References Cited

U.S. PATENT DOCUMENTS

| | | | |
|---|---|---|---|
| 2,024,003 | 12/1935 | Jewell | 73/710 |
| 2,173,287 | 9/1939 | Rose | 73/710 |
| 2,599,671 | 6/1952 | Thompson | 73/756 |

*Primary Examiner*—Donald O. Woodiel
*Attorney, Agent, or Firm*—Shoemaker and Mattare, Ltd.

[57] ABSTRACT

A pressure sensing device having attached thereto an extended heated sensing tube said device being surrounded by a heated enclosure.

2 Claims, 2 Drawing Figures

VACUUM GAUGE

BACKGROUND OF THE INVENTION

1. Field of the Invention

This invention relates to an apparatus for measuring small increments of pressure variations below atmospheric pressure. More specifically it deals with measuring pressure variations in reaction chambers wherein the reactants are condensable to liquid or solid phase at atmospheric temperatures and pressures.

2. Description of the Prior Art

In most pressure gauges or vacuum gauges the apparatus is placed at the surface of the reaction container. This type of measurement will cause problems in that the area near the surface of the container and the area inside the gauge where the reactants are allowed to enter, is not of the same temperature as that of the center of the reaction chamber. Because of this true readings are not obtained particularly where the pressure variations are of a very low caliber requiring a sensitive reading.

This is further compounded when dealing with reactants that are normally solid or liquid under ambient conditions. In that case the fact of temperature variations can cause condensation of the reactants particularly near the surface area and within the pressure gauge itself thus defeating a true reading. When the pressure variations are miniscule this can make a great difference.

There is, therefore, a need for a pressure gauge or vacuum gauge which will have the sensitivity to measure slight variations in reaction chambers which will give true readings.

BRIEF SUMMARY OF THE INVENTION

1. Objects of the Invention

It is, accordingly, one object of the present invention to provide an apparatus for measuring pressure within a reaction chamber under vacuum.

A further object of the invention is to provide an apparatus which is capable of measuring small variations in pressure in a vacuum chamber accurately by means of the use of a sensing tube attached to the pressure gauge.

A still further object of the present invention is to set forth an apparatus which is capable of measuring pressure in a vacuum chamber wherein the reactants in the chamber are condensable under atmospheric conditions, by means of a sensing tube and a heated enclosure.

These and other advantages of the present invention will be apparent from the following detailed description and drawings.

In accordance with the above objects it has been found that accurate measurements of pressure showing small variations, can be made by modifying ordinary pressure gauges. These modifications include the use of a sensing tube which is attached to the pressure gauge and extends down into the reaction chamber. A further modification is the enclosing of the pressure gauge in a heated enclosure which concurrently heats the sensing tube so as to allow the detection of pressure variations of reactants which are condensable under atmospheric conditions.

DETAILED DESCRIPTION OF THE INVENTION

In accordance with the present invention, there has been developed an apparatus for measuring a slight variation of pressure in vacuum chambers. The apparatus of the present invention is also capable of measuring slight variations in pressure in reactors wherein the reactants are condensable under atmospheric conditions. This has been accomplished by modification of the pressure sensing devices by attaching thereto a sensing finger which will extend into the reactor. A further modification is that of enclosing the sensing device in an insulated heated enclosure.

A better understanding of the invention can be appreciated from the following descriptions of the drawings. For purposes of showing one specific application of this invention applicants have chosen an iodide crystal bar cell, however, the apparatus of the present invention is capable of being used on any reaction chamber.

Figure 1:
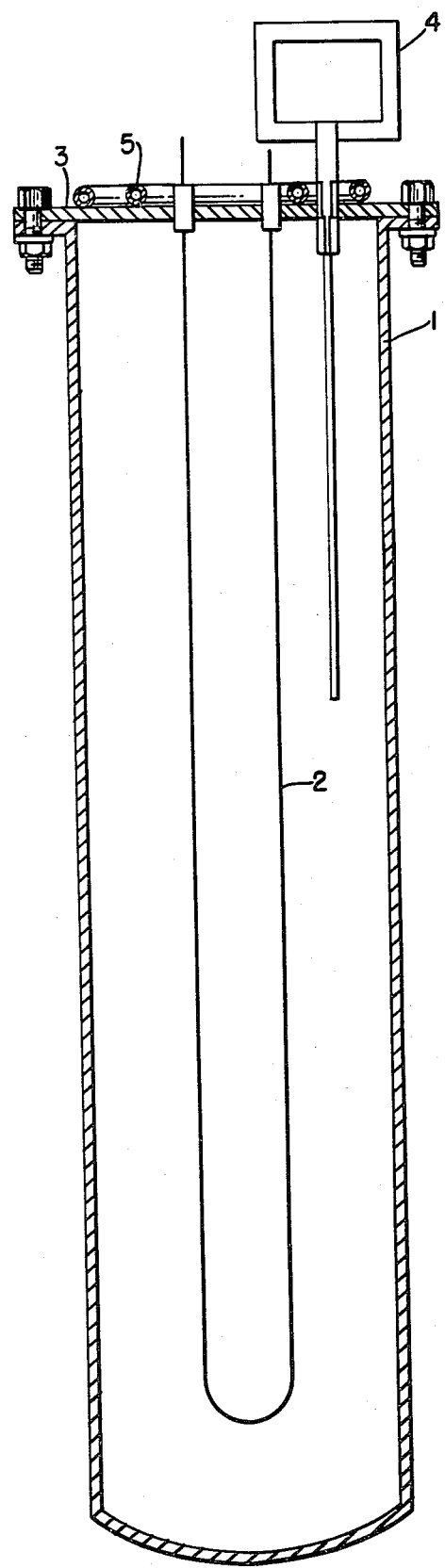
FIG. 1 is a sectional view of a reaction chamber having thereon the pressure sensing device.

Taking FIG. 1, there is shown a reaction chamber 1 which in this case is an iodide crystal bar cell having inserted therein filament 2 for supplying heat to cause the reaction to go to completion. The cell has a lid 3 having inserted therein the pressure sensing device of the present invention. In this particular reaction chamber there are also, located on the lid, cooling coils 5 for maintaining the temperature within the chamber.

Figure 2:
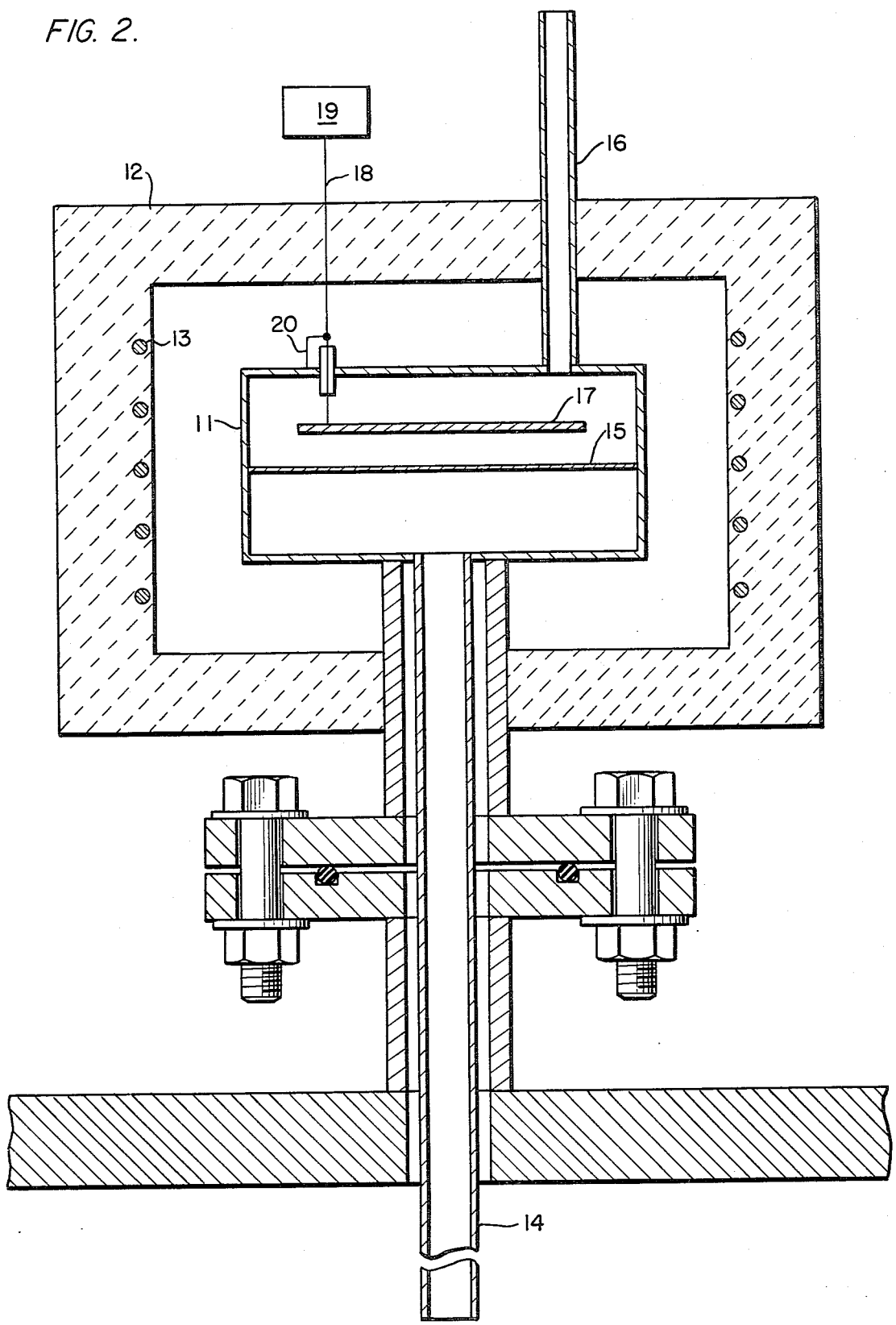
FIG. 2 is a more detailed enlarged sectional view of the pressure sensing device.

Referring to FIG. 2, there is shown an enlarged detail of the pressure sensing device of the present invention. In this case, the pressure sensing device which is modified is a capacitance manometer, however, other types of pressure sensing devices could be used in its place. In FIG. 2, the pressure sensing device is comprised of a differential pressure gauge 11 contained in an insulation chamber 12 having electrical heating elements 13 therein. The chamber 12 is connected to the inside of the reaction chamber by a hot sensing tube 14 and contains a metallic diaphragm 15 which responds to the variation in pressure from the reactor on the other side of diaphragm 15. The diaphragm is in contact with the reference atmosphere by the lead 16. Above the diaphragm 15 is located a fixed plate 17 which is connected by a coaxial cable 18 to sensing device 19. This cable is grounded to the cell at 20. Variations in the pressure of the cell are transmitted to the diaphragm which causes a variance of distance between diaphragm 15 and the fixed plate 17. This variance is in turn transmitted to the capacitance sensing device 19.

The modifications of the present invention are the heated enclosure and the extended sensing tube. This hollow tube allows the reactants at the center of the reactor to come in contact with the senser. The capacitance sensing device can be replaced by other sensing devices to which can be attached sensing tube and the heated enclosure of the present invention. One particular pressure gauge that may be modified by the present invention MKS Instruments Model 315BH-10SP made of inconel construction, which is a nickel-based superalloy having anticorrosive properties.

As this invention may be embodied in several forms without departing from the spirit or essential characteristics thereof, the present embodiment is, therefore, illustrative and not restrictive, since the scope of the invention is defined by the appended claims rather than by the description preceding them; and all changes that fall within the mete and bounds of the claims or that form their functional as well as conjointly cooperative equivalent are, therefore, intended to be embraced by those claims.

I claim:

1. A means for measuring pressure comprising: a pressure sensing device having attached thereto a heated hollow sensing tube attached to said pressure sensing device and extending into an iodide crystal bar cell, said sensing device being surrounded by a heated insulated enclosure.

2. A means for measuring small increments of pressure variations below atmospheric pressure of fluid reactants in a container which reactants are solid at atmospheric conditions, comprising:

a housing mounted on a lid of a container, said housing having insulated walls defining an insulation chamber in said housing;

a pressure sensing device mounted on said housing in said insulation chamber;

heating means in said housing for maintaining said insulation chamber at a temperature sufficiently high to maintain reactants whose pressure is being measured by said pressure sensing device in a vapor phase within said pressure sensing device; and an extended heat conductive hollow tube connecting said pressure sensing device to reactants located in the container, said tube being thermally isolated from the container to substantially prevent heat loss to that container, whereby it is substantially insured that reactants whose pressure is being measured by said pressure sensing means remain in a vapor phase within said tube and said pressure sensing device.

* * * * *